Nov. 8, 1960  R. J. WERTEPNY, SR., ET AL  2,958,944
GRASS SHEARS
Filed July 14, 1958  2 Sheets-Sheet 1
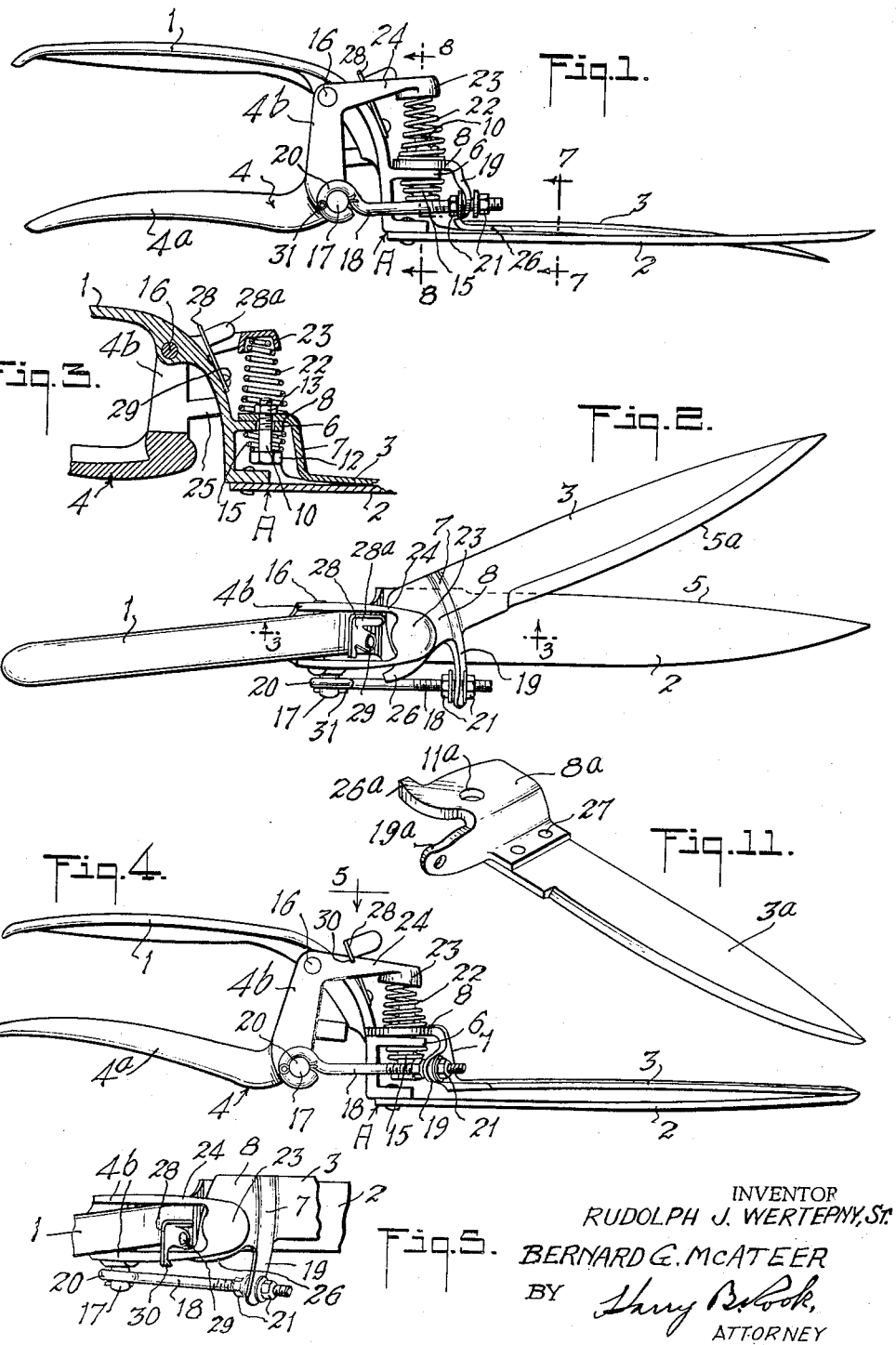
INVENTOR
RUDOLPH J. WERTEPNY, SR.
BERNARD G. McATEER
BY Harry B. Cook,
ATTORNEY

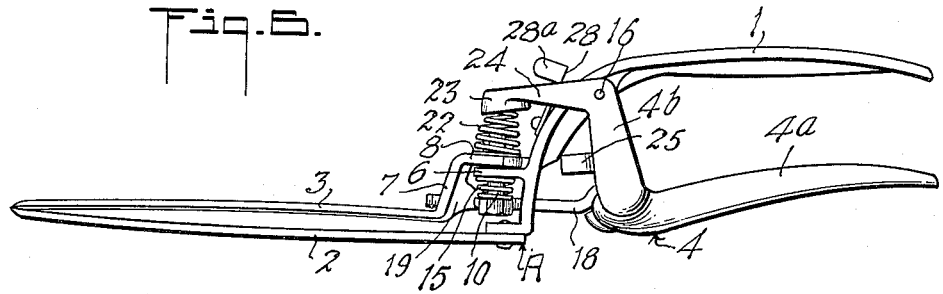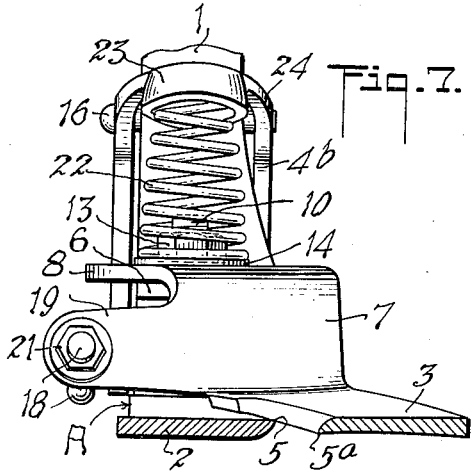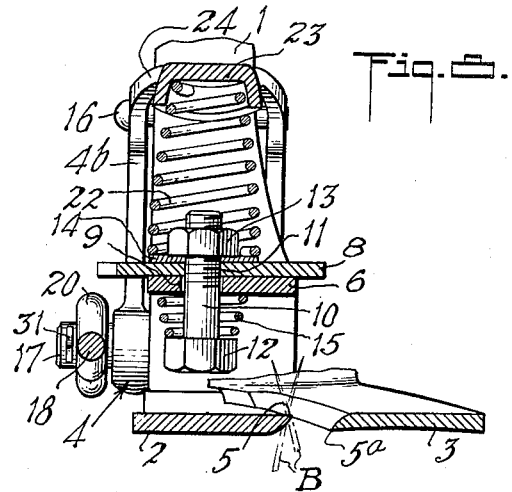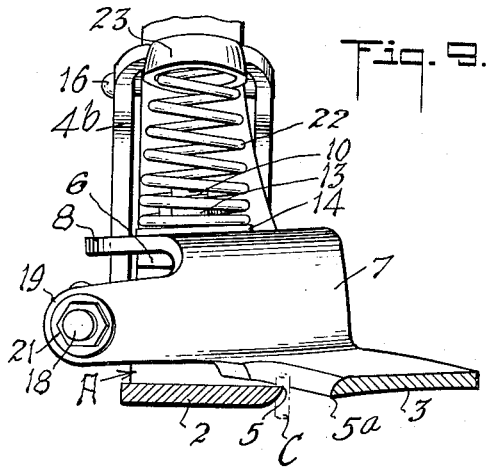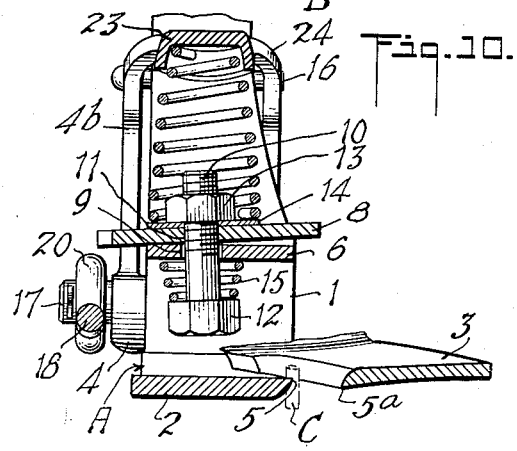

United States Patent Office 2,958,944
Patented Nov. 8, 1960

2,958,944
GRASS SHEARS

Rudolph J. Wertepny, Sr., West Orange, and Bernard G. McAteer, Rockaway, N.J., assignors to J. Wiss & Sons Co., Newark, N.J., a corporation of New Jersey Filed July 14, 1958, Ser. No. 748,333
4 Claims. (Cl. 30—248)

This invention relates to shears and more particularly grass shears; and the invention is especially directed to improvements in shears having a main section comprising an integral handle and cutting blade, a movable blade pivotally mounted on said section and a second handle pivotally mounted on said section for actuating the movable blade.

A primary object of the invention is to provide a shears of this character which shall include a novel and improved mounting of the movable blade on the main section and a novel and improved means for actuating the movable blade whereby the contact pressure between the cutting edges of the blades shall increase with the pressure incident to moving the movable blade relative to the other blade during shearing operations.

Another object is to provide such a shears wherein the mounting of the movable blade and the actuating means for the blade shall be related and cooperate with each other in a novel and improved manner such that the movable blade shall be canted relative to the other blade during the shearing movement of the movable blade so that upon an increase in the resistance to relative movement of the blades, as by a thick plant stem between the cutting edges, the pressure between the blades shall be greatly increased to overcome such resistance with a minimum of effort on the part of the operator of the shears.

A further object is to provide a novel and improved construction and combination of a mounting for the movable blade on the main section, the second handle pivotally mounted on the main section, and a spring for both biasing the second handle into its normal or retracted position and for biasing the movable blade toward the fixed blade.

Still another object is to provide such a pivotal mounting of the movable blade on the main section which shall include a pivot arm or blade ride on the main section, a pivot bolt connected to the movable blade and relatively rockably mounted in said ride, and spring means for normally influencing the movable blade into contact with said ride to hold the movable blade in a normal relation to the other blade such that the movable blade can be actuated during ordinary shearing operations with the application of minimum pressure on the handles, but shall also readily permit canting of the movable blade relative to the other blade upon increase in resistance to relative movement of the blades during a shearing operation so as to increase the contact pressure between the cutting edges of the blades with a relatively small increase in the force applied to the handles.

It is another object of the invention to provide a novel and improved, simple, easily adjustable and relatively inexpensive connection between the pivotally mounted handle and the movable blade.

Other objects, advantages and results of the invention will be brought out by the following description in conjunction with the accompanying drawings in which Figure 1 is a side elevation of a grass shears embodying the invention, showing the blades in normal, retracted, or rest position;

Figure 2 is a top plan view of the shears;

Figure 3 is a fragmentary vertical longitudinal sectional view on the plane of the line 3—3 of Figure 2;

Figure 4 is a view similar to Figure 1 showing the relative positions of the parts during a shearing operation;

Figure 5 is a fragmentary view similar to Figure 2 showing the positions of the parts corresponding to Figure 4;

Figure 6 is an elevation of the side of the shears opposite that shown in Figure 4 with the parts in the same relative positions;

Figure 7 is a greatly enlarged transverse vertical sectional view approximately on the plane of the line 7—7 of Figure 1;

Figure 8 is a similar view on the plane of the line 8—8 of Figure 1 showing the positions of the blades during a normal shearing operation;

Figure 9 is a view similar to Figure 7 showing the positions of the blades when exceptionally great resistance to relative movement of the blades is encountered;

Figure 10 is a view similar to Figure 8 with the parts in the position shown in Figure 9; and Figure 11 is a perspective view of a modified form of the movable blade.

Specifically describing the illustrated embodiment of the invention, the shears comprises a main section A which includes a handle 1 and a blade 2 rigidly secured to the handle in any suitable manner as by rivets 3. Pivotally associated with the main section are a movable blade 3 and a second handle 4 for actuating it, the said blades having cutting edges 5 and 5a respectively that are cooperative for performing shearing operations, particularly for cutting grass.

More specifically describing the invention, the main section 1 includes a support or ride 6 adjacent the inner end of the blade 2 on which the movable blade is pivotally supported. As shown, a portion of the movable blade near the heel end is offset from the plane of the blade as indicated at 7 and the blade has heel plate or pivot portion 8 angularly related to the offset portion and approximately parallel to the general plane of the blade. The support-ride 6 has a pivot opening 9 therethrough whose axis is approximately perpendicular to the general plane of the blade 2 and through which loosely passes a pivot element in the form of a bolt 10 that has a portion slidable through an opening 11 in the pivot portion 8 of the movable blade 3 as best shown in Figures 3 and 8. The bolt has a head 12 at one end beneath the support-ride 6, and on the other end of the bolt is screwed a nut 13, preferably with a washer 14 between the nut and the upper side of the pivot portion 8 of the movable blade, each of said head and said nut providing a shoulder at one end of the bolt. A compression spring 15 is interposed between the head 12 of the bolt and the underside of the support-ride 6 for normally drawing the pivot portion 8 of the movable blade into abutting relation to the top side of the support-ride. With this construction, the movable blade may rock or cant in all directions about the pivotal connection, the bolt being free to assume positions at angles to the axis of the pivot opening 9 as best shown in Figures 3, 8, and 10. Furthermore, the spring 15 constantly yieldingly presses the movable blade 3 toward the other blade 2 so as to maintain proper contact pressure between the cutting edges during cutting operations. This is particularly important when the shears is used with the movable blade in contact with a surface such as the ground or a table top because the pressure of the movable blade against such a surface tends to force the movable blade out of contact with the other blade during a shearing operation and thereby prevent cutting or shearing coaction between the cutting edges of the blades. It appears that the location of the point of application of the force of the spring 15 to the movable blade at a point close to the engagement of the blade with the ride makes possible this function of the shears.

The second handle 4 has a main grip portion 4a and 2 parallel arms 4b angularly related to the grip portion 4a and straddling the main handle portion 1, and the two arms 4b are pivotally connected at 16 to the main handle 1 so that the second handle 4 may oscillate about the pivotal connections 16.

The second handle 4 has a stud 17 projecting from one side thereof and connected by a link 18 to an actuating arm 19 that is rigidly connected to the movable blade and extends laterally therefrom below the pivotal connection 6, 9, 10 of the movable blade to the main section and preferably above and approximately parallel to the general plane of the movable blade. The arm 19 projects from the forward edge of the movable blade and has a transverse opening through which loosely passes one end of the link 18, the other end of which has a pivot eye 20 loosely encircling the stud 17. Adjustable nuts 21 are screw threaded on the end of the link 18 at opposite sides of the arm 19 as best shown in Figures 1 and 2, thereby providing loose connections between the link 18 and the arm 19.

A compression spring 22 is interposed between the pivot portion 8 of the movable blade and an inverted cup 23 on an extension 24 of the operating handle 4 at the side of the pivot 16 opposite the grip portion 4a. The spring is preferably a conical helical spring having its larger end abutting the pivot portion 8 of the movable blade and its small end removably seated in the cup 23. The primary purpose of this spring is to normally bias or urge the operating handle 4 into its normal retracted position as shown in Figures 1 and 3, but the spring also serves the function of pressing the pivot portion 8 of the movable blade against the support-ride 6 and of maintaining yielding pressure on the movable blade during canting or rocking thereof relatively to the support-ride and to the other blade 2. The operating handle has a stop lug 25 to abut the main handle 1 and limit the movement of the operating handle 4 under the influence of the spring 22.

With this construction, it will be observed that normally the blades will be in separated or angular relation to each other as shown in Figures 1 and 2. When it is desired to perform a shearing operation, the two handles 1 and 4 are grasped by the operator and squeezed together so that the link 18 will cause the movable blade to swing relatively to the blade 2 and thus effect cutting coaction of the cutting edges 5 and 5a of the 2 blades to sever blades B of grass or the like. Normally the movable blade will easily slide over the blade 2 and the cutting operation can be performed with ease and with only a small force applied to the handles, but should unusually great resistance to relative sliding of the blades be encountered, for example, by the interposition of a thick weed stem C between the blades, the movable blade will cant or rock about its pivotal connection 6, 9, 10 with the support-guide as shown in Figures 9 and 10 to resist the tendency of the blades to separate and to insure a proper contact pressure between the cutting edges during the shearing operation. Upon release of pressure on the operating handle 4, the spring 22 will spring the handle to its normal position and by cooperation of the springs 22 and 15, the movable blade will be tilted back to its normal position so as to relieve the contact pressure between the blades as the movable blade returns to its normal position shown in Figure 2.

It will also be observed that when the movable blade encounters exceptionally strong resistance, greater force must be applied to the operating handle 4, but at the same time, the increased force exerts a compound downward and forward pull on the movable blade so that the contact pressure between the blades is increased. The loose mounting of the pivot bolt 10 and the opening 9 provides for varying degrees of cant or angular relation of the plane of the movable blade to the other blade in accordance with the increase in resistance to the cutting action and the increase in the force applied to the operating handle. Accordingly, the shears may be operated, even with exceptional resistance to relative movement of the blades, with a relatively small pressure or force applied to the handles.

Desirably, the movable blade has a stop finger 26 to engage the main section 1 and limit movement of the blade under the influence of the operating handle.

It will be noted that the swinging movement of the movable blade relatively to the other blade can be adjusted by proper adjustment of the nuts 21 on the link 18.

In some instances it may be desirable to make the movable blade in two pieces, namely, a steel forging 3a and a cast pivot portion 8a rigidly secured together as by rivets 27, and the casting may have an arm 19a corresponding to the arm 19, as well as a finger 26a corresponding to the finger 26. Of course, the casting will also have an opening 11a corresponding to the opening 11.

It will be noted that the spring 22 is normally held in position and against displacement by the nut 13 and the cut 23, but the spring can be easily and quickly removed by simply compressing it and pulling the small end out of the cup whereupon the movable blade can be easily disconnected from the main section 1 by simply removing the nut 13 and bolt 10. Furthermore, the blade can be easily disconnected from the handle 4 by simply removing the outer one of the nuts 21 from the link 18. The link 18 can be easily disconnected from the stud 17 by simply removing the cotterpin 31.

It is also desirable to provide a catch or latch cooperative with the handle portions for holding the blades in aligned overlapping position as shown in Figures 4 and 5, and for this purpose, we have shown a sheet metal latch 28 pivotally connected at one end to the main section as indicated at 29 and having a lateral hooked portion 30 to engage over one of the arms 4b of the operating handle 4 as shown in Figures 4 and 5. A finger piece 29a is provided for swinging the latch into and out of engagement with the arm 4b.

While we have shown the invention as embodied in certain structural details, it will be understood that the construction of the shears may be widely modified and changed within the spirit and scope of the invention. For example, the bolt 10 might be made loose in the opening 11 of the blade instead of in the opening 9 of the support-ride 6, or the bolt may be loose in both of said openings.

What we claim is:

1. Shears comprising a main section having a handle and blade fixedly connected at one end thereof to said handle, a movable blade, said main section and one end portion of said movable blade having registering openings, a pivotal connection between said movable blade and said main section including a pivot element passing loosely through said openings in both said main section and said movable blade so as to be capable of tilting, an operating handle pivotally mounted on said section, an actuating arm for said movable blade extending laterally therefrom intermediate its ends beyond the cutting edge thereof, and a link connecting said operating handle and said actuating arm so as to simultaneously swing and cant said movable blade toward the other blade upon movement of the operating handle in one direction during cutting operation of the shears and to simultaneously swing and cant the movable blade away from the other blade upon swinging of the operating handle in the opposite direction, said operating handle being pivotally mounted intermediate its ends and has an extension at the other side of said pivotal connection overhanging the end of said pivot element, said link being connected to the handle at one side of said pivotal connection, a spring interposed between said movable blade and said extension of the operating handle, and a catch for holding said operating handle in normal position with said blades in aligned relation to each other, said catch being pivotally mounted at one end of the first-mentioned handle and having a hooked portion to engage over the portion of the operating handle between said spring and the pivotal connection of the operating handle to said section.

2. Shears comprising a main section having a handle and a blade rigidly connected to the handle, a movable blade, said section having a support-ride thereon for the movable blade above and in substantially spaced relation to the first-mentioned blade, said movable blade and said support-ride having registering openings therethrough, a pivot element separate from both said support-ride and said movable blade and through one of said openings loosely so as to be capable of tilting and having a shoulder at each end thereof, said movable blade having an actuating arm projecting laterally therefrom beyond the cutting edge thereof and substantially below said support-ride, an operating handle pivotally connected to said section and having an extension overhanging the end of the pivot element, a link loosely connecting said operating handle to said actuating arm so that said movable blade will be simultaneously swung and canted in one direction toward the other blade to increase the contact pressure between the cutting edges of the two blades upon swinging of the operating handle in one direction during cutting operation and the movable blade will be swung and canted away from the other blade upon swinging of the operating handle in the opposite direction, a spring interposed between said extension of the operating handle and said movable blade adjacent said pivot element to move said handle in the second-mentioned direction and to yieldingly hold said movable blade against said support-ride.

3. Shears as defined in claim 2 wherein said spring is interposed between said movable blade and said extension of the handles above said support-ride.

4. Shears as defined in claim 2 wherein said spring is an helical compression spring and one end of which separably encircles said pivot element and said operating handle has an inverted cupped seat in which the other end of said spring is removably seated.

References Cited in the file of this patent

UNITED STATES PATENTS

| | | |
|---|---|---|
| 1,562,630 | Ginnel | Nov. 24, 1925 |
| 2,281,977 | Keiser | May 5, 1942 |
| 2,607,114 | Keiser | Aug. 19, 1952 |
| 2,683,311 | Smith | July 13, 1954 |
| 2,720,024 | Keiser | Oct. 11, 1955 |
| 2,840,976 | Keiser | July 1, 1958 |